(12) United States Patent
Walter et al.

(10) Patent No.: US 11,298,673 B2
(45) Date of Patent: Apr. 12, 2022

(54) FLUID REACTOR

(71) Applicant: LEON-NANODRUGS GMBH, Munich (DE)

(72) Inventors: Moriz Walter, Gechingen (DE); Mario Bott, Stuttgart (DE)

(73) Assignee: LEON-NANODRUGS GMBH, Munich (DE)

( * ) Notice: Subject to any disclaimer, the term of this patent is extended or adjusted under 35 U.S.C. 154(b) by 89 days.

(21) Appl. No.: 16/620,932

(22) PCT Filed: Jun. 18, 2018

(86) PCT No.: PCT/EP2018/066070
§ 371 (c)(1),
(2) Date: Dec. 10, 2019

(87) PCT Pub. No.: WO2018/234217
PCT Pub. Date: Dec. 27, 2018

(65) Prior Publication Data
US 2020/0156038 A1 May 21, 2020

(30) Foreign Application Priority Data
Jun. 19, 2017 (DE) .................... 10 2017 210 202.0

(51) Int. Cl.
*B01J 19/06* (2006.01)
*B01J 19/26* (2006.01)
(Continued)

(52) U.S. Cl.
CPC ............... *B01J 19/06* (2013.01); *B01J 2/04* (2013.01); *B01J 4/002* (2013.01); *B01J 19/26* (2013.01); *B01J 2219/00601* (2013.01)

(58) Field of Classification Search
CPC ..... B01J 19/06; B01J 2/04; B01J 4/002; B01J 19/26; B01J 2219/00601; B01J 2/02; B01F 5/0256
(Continued)

(56) References Cited

U.S. PATENT DOCUMENTS 4,908,154 A 3/1990 Cook et al.
7,491,332 B2 2/2009 Boulant
(Continued)

FOREIGN PATENT DOCUMENTS

CN 102430380 A 5/2012
CN 105555376 A 5/2016
(Continued)

OTHER PUBLICATIONS

Office Action received for the Chinese Patent Application No. 201880040285.8, dated Jun. 2, 2021, 12 pages (6 pages of English translation & 6 pages of Original document).
(Continued)

*Primary Examiner* — Huy Tram Nguyen
(74) *Attorney, Agent, or Firm* — Harness, Dickey & Pierce, P.L.C.; Stephen T. Olson

(57) ABSTRACT

A fluid reactor for generating particulate fluids by collision, has a housing which encloses a collision chamber, a first fluid nozzle, and a second fluid nozzle oriented opposite thereto in a collinear manner, which is located directly opposite the first fluid nozzle in a jet direction of the first and second fluid nozzles in a common collision zone, at least one rinsing fluid inlet into the collision chamber arranged on a first side of the first fluid nozzle, and at least one product outlet out of the collision chamber arranged on a second side of the second fluid nozzle.

9 Claims, 4 Drawing Sheets

Figure 1:
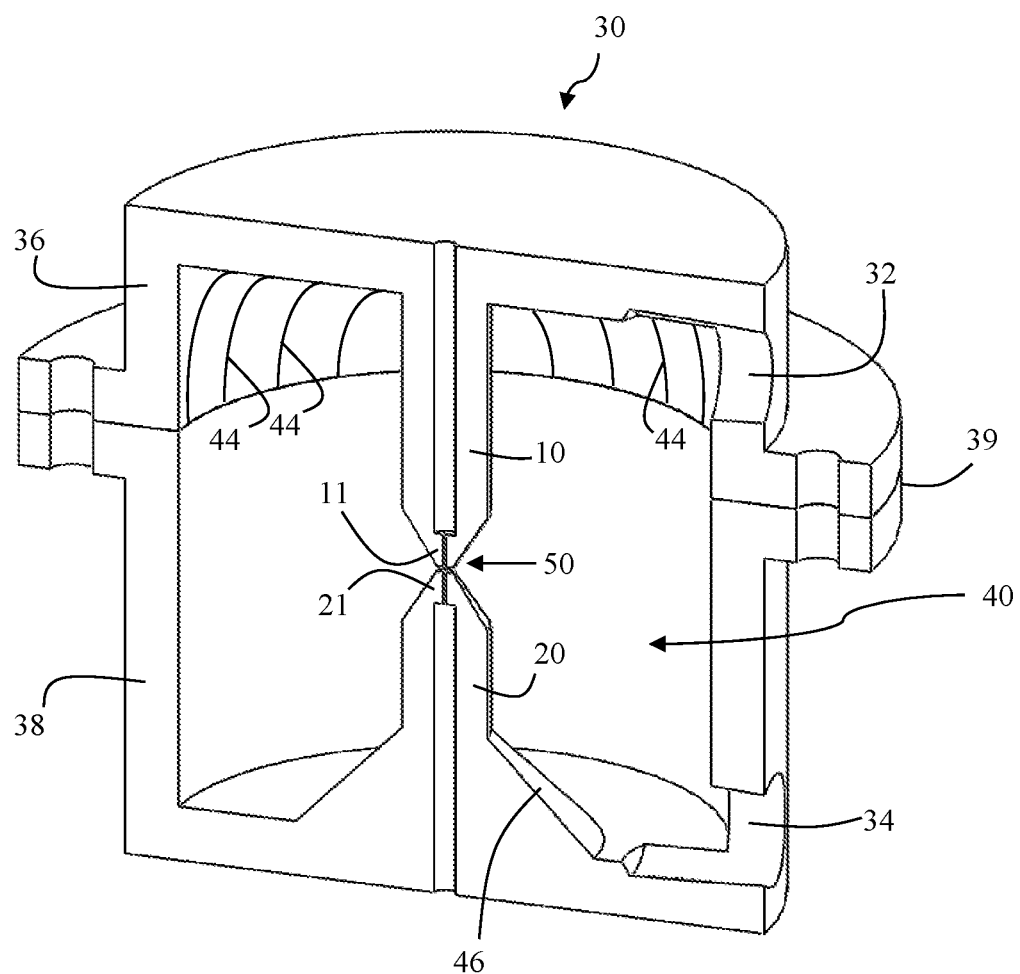

(51) Int. Cl.
    *B01J 2/04* (2006.01)
    *B01J 4/00* (2006.01)
(58) Field of Classification Search
    USPC .......................................................... 264/13
    See application file for complete search history.

(56) References Cited

U.S. PATENT DOCUMENTS

| | | |
|---|---|---|
| 8,852,644 B2 | 10/2014 | Baumstuemmler et al. |
| 2004/0101454 A1 | 5/2004 | Johnson et al. |
| 2016/0122195 A1 | 5/2016 | Darbha et al. |
| 2016/0325265 A1 | 11/2016 | Zhu et al. |

FOREIGN PATENT DOCUMENTS

| | | | |
|---|---|---|---|
| DE | 102005048201 A1 | 4/2006 | |
| DE | 102006004350 A1 | 8/2007 | |
| DE | 102007008878 A1 | 6/2008 | |
| EP | 1165224 B1 | 9/2002 | |
| GB | 2063695 A | * 6/1981 | ............ B01F 3/0807 |
| GB | 2063695 A | 6/1981 | |
| WO | WO-2014181361 A2 | 11/2014 | |

OTHER PUBLICATIONS

Zhengming Gao et al., "Micromixing efficiency in a T-shaped confined impinging jet reactor", Chinese Journal of Chemical Engineering, CN, vol. 23, No. 2, Dec. 2, 2014 (Dec. 2, 2014), pp. 350-355, DOI: 10.1016/j.cjche.2014.11.024, ISSN: 1004-9541, XP055503678.

International Search Report (in English and German) and Written Opinion (in German) issued in PCT/EP2018/066070, dated Sep. 13, 2018; ISA/EP.

* cited by examiner

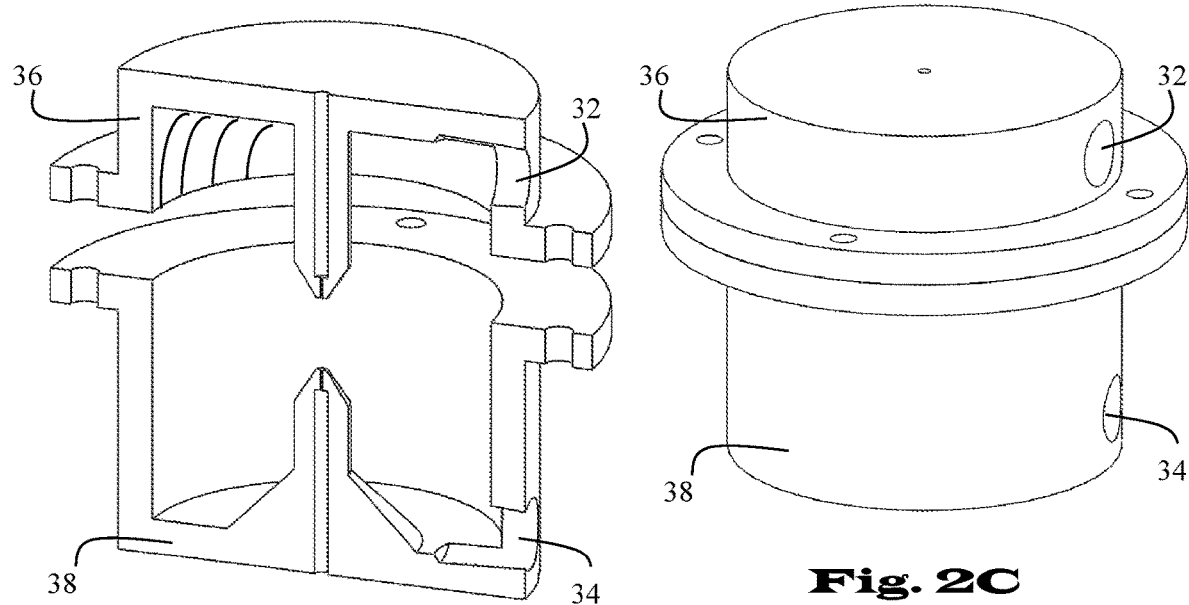
Fig. 2A
Fig. 2C
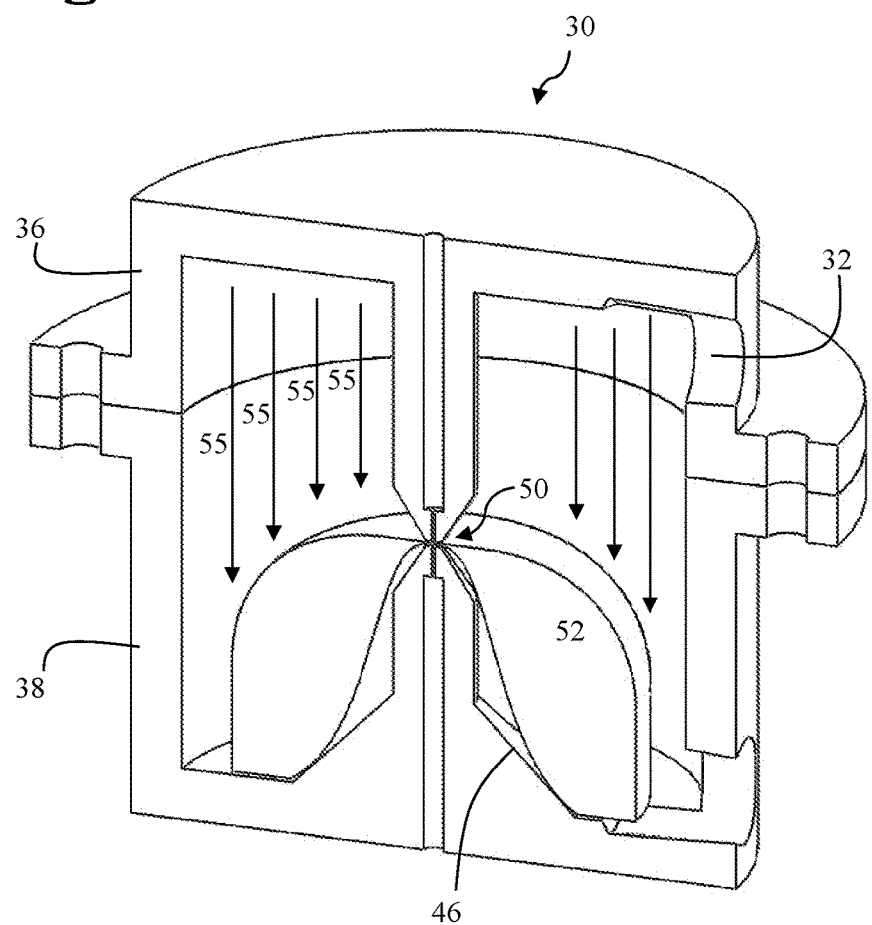
Fig. 2B

FLUID REACTOR

CROSS-REFERENCE TO RELATED APPLICATIONS

This application is a 371 U.S. National Phase of International Application No. PCT/EP2018/066070, filed Jun. 18, 2018, which claims the benefit of German Patent Application No. 10 2017 210 202.0, filed Jun. 19, 2017. The entire disclosures of the above applications are incorporated herein by reference.

The invention relates to fluid reactors, especially so-called impinging jet reactors, for the generation of nanoparticles by precipitation from fluid media. The invention relates to methods and means for the production of nanoparticles with a narrow particle size distribution from a solution, especially for use in chemical or pharmaceutical products.

Nanoparticles of a substance or a mixture of substances can be obtained from solutions of this substance or mixture or a precursor thereof by precipitation, when the fluid in which the substance or its precursor is dissolved meets a precipitation bath under high pressure, and consequently at high speed. This results in an atomization of the fluids and thus the formation of the precipitated product in the form of nanoparticulate structures. One technical realization is known as the "impinging jet" method. For this purpose, fluid reactors are used, wherein the two fluids, that is, the fluid to be precipitated on the one hand and the precipitating fluid on the other hand, are pressed under high pressure by two opposing fluid nozzles, so that the two fluids meet as free jets at high speed in a collision zone between these nozzles. This results in a so-called "collision disk", which, due to the superposition of the momentum of the two fluids, propagates transversely to the respective original direction of the two fluids, i.e., transversely to the jet direction. At the collision point of the two free jets, a chemical precipitation reaction thereby takes place due to a highly turbulent mixing of the two incompatible media, in which case, at the same time and due to the shear forces prevailing in this highly turbulent mixing, the precipitated product results in the form of nanoparticles or is directly dissipated into the same during precipitation. It is assumed that the particle size of the particles is a function of the velocity gradient at the collision point. Depending on the product composition, the particle size of the particles is, however, also dependent on the temperature and/or pressure in the system. As a rule, particles, particle sizes in the range from 50 to 500 μm are obtained.

The two free jets exiting from the opposing nozzles collide and become completely depleted in the resulting collision disk. The nanoparticulate product present in the collision disk is collected in the reactor and subsequently removed therefrom. It is often necessary to separate the nanoparticles from the nanoparticulate fluid of the collision disk. In order to remove the nanoparticulate fluid of the collision disk from the reactor, the reactor can be rinsed intermittently or continuously with a rinsing medium. The removal of the nanoparticulate fluid is known to take place in the direction of the plane of the collision disk, i.e., transversely to the orientation of the two colliding free jets.

A disadvantage of known reactors of this type is that the particle size distribution of the nanoparticles obtained is broad and, moreover, strongly depends on the operating parameters used, in particular pressure and flow rate, but also on the physico-chemical properties of the media, above all viscosity and surface tension. Accurate control of operating parameters is required to obtain reproducible results. However, in known fluid reactors, even under ideal operating conditions, only grain size distributions which are insufficiently wide for some applications are available, and further measures to separate grain sizes are required.

As a result, the desire existed to further develop methods and means for the production of nanoparticles by means of an "Impinging Jet" method, such that reproducible nanoparticles, which advantageously have a narrow particle size distribution, can be obtained in a manner that is straightforward, i.e., not requiring the close control of parameters, as well as reliably reproducible.

This technical problem is solved by providing a fluid reactor for generation of nanoparticulate fluids, especially nanoparticles, by collision according to claim 1.

In particular, by means of a fluid reactor having a housing which encloses a collision chamber. Protruding into said collision chamber are a first fluid nozzle and, arranged opposite thereto in a collinear manner, a second fluid nozzle, which is directly opposite the first fluid nozzle in the jet direction of the nozzles in a common collision zone. According to the invention, the reactor has on the housing at least one rinsing fluid insert arranged on the side of the first fluid nozzle, which opens into the collision chamber. The fluid reactor also has at least one product outlet located on the side of the second fluid nozzle and leading out of the collision chamber.

According to the invention, the fluid reactor provided is particularly characterized in that specifically shaped structures are formed on the side of the first fluid nozzle, which have the rinsing fluid, be it a gas or a fluid, which can be supplied via the rinsing fluid inlet. In this context, these structures are suitable, in the collision chamber and at least in the area of the collision zone, to generate a directional, in particular laminar, rinsing fluid flow running in the jet direction of the first fluid nozzle, with rinsing-fluid-conducting structures being formed as parallel channels on the side of the first fluid nozzle. By "directed" flow is meant herein a preferably laminar flow profile, in which case the fluid flows in layers that do not mix and form no vortex. The characteristic Reynolds number Re as a function of flow velocity, the characteristic length of the reactor geometry, and the viscosity, should for this purpose not exceed a value of Re=2300.

That is, according to the invention, in the operation of the reactor, that is, during the collision of the two free jets emerging from the first and second fluid nozzles, a directed, in particular laminar, flow of a rinsing fluid is present which runs in principle parallel to the direction of the exiting free jets, that is, essentially orthogonal to the resulting collision disk. As a result, it is achieved according to the invention that the collision disk is deflected in its propagation in the direction of the directed net flow of the rinsing fluid.

This means, in particular, that the flat collision disk originally forming substantially perpendicularly to the propagation direction of the free jets is deflected in a practically mushroom-shaped manner, that is to say preferably in the form of a dome or a rotational paraboloid. In a first approximation, the concrete shape of the collision cone forming with the deflection by means of the directed, in particular laminar flowing rinsing fluid, is given by the vector addition of the propagation velocity of the nanoparticulate fluid from the collision zone on the one hand and the profile of the directed rinsing fluid on the other.

This advantageously achieves that the particles present in the formed nanoparticulate fluid of the collision disk are safely and reliably conveyed away from the collision zone and thus advantageously also from the colliding free jets, whereby the probability that already formed particles return to the collision zone or collide into the free jets, is significantly reduced.

It has surprisingly been found that the outcome of the process, namely the production of nanoparticles, can be significantly improved by this method and operating condition, which inevitably results from the particular structural design of the fluid reactor according to the invention. On the one hand, the quality and, in particular, the size distribution of the nanoparticles are less dependent on the selected operating and process parameters, so that more reliable and reproducible nanoparticulate products can be obtained. On the other hand, it has surprisingly been found that this significantly improves the particle size distribution of the available nanoparticles compared with the nanoparticles which can be produced by known processes, which is to say it has reduced them.

In the context of the invention, "collinear" is meant not only an angle of 0° (in the case of rectified orientation) or, alternatively, 180° (in the opposite orientation), but rather "collinear" also includes practically conceivable deviations from this angle of interaction. The term "collinear" therefore preferably includes angles of interaction of −10° to +10°, which is to say 170° to 190°.

In the context of the invention, "collinear" does not only mean that the two interacting jets or nozzle orientations are aligned or run in a common axis, but "collinear" also includes practically feasible deviations in the form of lateral displacement of the jets or nozzle axes. Ideally, a 100% overlap of the jets is provided, that is, in particular, the jets or alternatively nozzle axes are aligned. However, the term "collinear" preferably also includes overlaps of 50% or more, preferably 70% or more. The necessary degree of overlap is also dependent on the jet profile of the free jets emerging from the nozzles. The person skilled in the art knows the corresponding relationships.

In the following, particular embodiments of the fluid reactor according to the invention will be described which additionally each support the advantageous operation of the reactor according to the invention, and are particularly suitable for preventing the rebound of formed nanoparticles into the collision zone and thus also into the free jets.

In a preferred embodiment, a structured impact wall is provided in the collision chamber of the fluid reactor, at least on the side of the second fluid nozzle, where the collision disk can be deflected due to the generatable, in particular laminar, rinsing fluid flow. This structured impact wall is designed in such a way that the momentum of particles from the formed nanoparticulate fluid impinging thereupon is scattered and/or damped, so that, in particular, an elastic rebounding of the particles into the collision chamber and, in the worst case, into the collision zone or the free jets is prevented. For this purpose, the impact wall is preferably structured in order to break the impacting fluid drops. Preference is given to open-pore or spongy structures, preferably sintered structures, metal, glass or ceramic foams or frits.

In preferable embodiments, the rinsing fluid conducting structures, which are designed as structured ridges or similar structures for the creation of a directed, in particular laminar flow of the rinsing fluid and in particular a flow of the rinsing fluid parallel to the flow direction of the free jets exiting the nozzles. These structures are in the fluid reactor to suppress the creation of turbulence in the rinsing fluid introduced into the collision space and to direct the flow of the rinsing fluid. In a preferred variant, these structures are formed as parallel channels or grooves. The same are preferably arranged concentrically around the centrally extending first fluid nozzle. In a preferred embodiment, these channels open in the vicinity of the tip of the first fluid nozzle, where the free jet of the first medium emerges, in the collision zone, so that, at least in the area of the collision zone, a directed, in particular laminar, flow of an introduced rinsing fluid can be formed.

In a preferred variant, a projection is formed as a rinsing-fluid-conducting structure such that, at least in the area of the head of the first fluid nozzle on the housing, in particular on the wall of the collision chamber, the same forms a first fluid conducting space in the collision chamber that is concentrically arranged around the central first fluid nozzle and, in particular, is tapered. It is envisaged that, in this preferably formed fluid conducting space, the directed flow of an introduced rinsing fluid is directly directed to the outlet opening of the free jet of the first medium from the first fluid nozzle. It is thus achieved that the rinsing fluid flows closely along the shaft of the first fluid nozzle and at the tip of the first fluid nozzle and coaxially surrounds the free jet of the first medium emerging there. Without wishing to be bound by theory, the emerging free jet thus entrains the rinsing fluid flow according to the principle of a Venturi nozzle, accelerates the same and steers it directly and in the direction of the free jet perpendicular to the resulting collision disk, which can thereby be directly diverted transverse to its propagation direction by the rinsing medium.

In an additional preferred embodiment, a projection is also formed in the area of the head of the second fluid nozzle, in particular on the wall of the collision chamber, which in the area of the head of the second fluid nozzle forms a second fluid conducting area in the collision chamber that is concentrically arranged around the fluid nozzle and preferably tapered. The second fluid conducting space is thereby dimensioned so that it follows the collision disk deflected by the rinsing medium. It is particularly provided that the second fluid conducting space expands in the propagation direction of the deflected collision disk, so that preferably a pressure drop and a speed reduction of the formed and flowing nanoparticulate fluid is made possible. This measure additionally prevents particles from the formed nanoparticulate fluid from finding their way back to the point of their formation, which is to say to the collision zone or even to the free jets.

It is supported or enabled by these measures that the collision disk deflecting rinsing fluid according to the invention hits the collision zone substantially perpendicular to the collision disk, thus in the direction of propagation of the collision disk, which is to say in the flow direction of the nanoparticulate fluid formed in the collision zone, oriented along the flow direction of the rinsing fluid. This means that the flow direction of the formed nanoparticulate fluid pivots in the flow direction of the rinsing fluid, so that, according to the invention, these flows ultimately run parallel, whereby the rinsing fluid now directly supports the removal of the formed nanoparticles from the reactor. It is preferably provided that the dimensioning of the aforementioned structures is adapted to the possible operating parameters, so that pressure and flow conditions are achievable which force a continuous deflection of the collision disk. This means, in particular, that the collision disk deflected according to the invention and deformed into a collision cone describes, in longitudinal section, a strictly decreasing monotonic function. This means that nanoparticles formed at any point in the deflected collision disk do not flow counter to their primary net flow direction or even back towards the free jets or to the collision zone.

The diameter of the nozzles is preferably from 50 to 500 μm, in particular from 100 to 500 μm, preferably from 200 to 400 μm, in a specific variant about 300 μm.

The invention also relates to a method for the production of nanoparticulate fluid, that is to say nanoparticles from components or component mixtures dissolved in a solvent. The method involves that a first fluid medium, that is the medium in which the component from which the nanoparticles are to be formed, is dissolved, pressed through a first fluid nozzle, and exits there at high speed, and that, in addition, a second fluid medium, which contains precipitants for precipitating the components dissolved in the first fluid medium, is pressed through a second fluid nozzle, which is arranged collinearly to the first fluid nozzle, but oppositely oriented, the second fluid nozzle being directly opposite the first fluid nozzle, in such a manner that, in the method step, the two exiting free jets of the first and second fluid media collide with one another at such high speed in a common collision zone that the component dissolved in the first medium is precipitated by the precipitating agent and, in particular at the same time, a collision disk is formed extending from the collision point that is transverse to the jet direction of the nozzle, said disk comprising the precipitated component as a nanoparticulate fluid. According to the invention, the method is then characterized in that a directed rinsing fluid flow directed essentially parallel to the jet direction of the nozzles or the free jets is generated so that the forming collision disk is deflected transversely to its primary propagation direction by the rinsing fluid flow, and a collision cone is formed.

Preferably, the method provides that the fluid reactor described herein and designed in a particular manner will be used.

It is preferably provided that the rinsing fluid flow conveys the formed nanoparticulate fluid in the jet direction of the nozzles or of the free jets from the collision zone. It is preferably provided that the rinsing fluid flow conveys the nanoparticulate fluid into a fluid space which avoids or prevents a rebounding of particles formed into the collision zone. The fluid space is preferably formed as an expansion space.

Alternatively or additionally, it is preferably provided that the rinsing fluid flow conveys the formed nanoparticulate fluid in the jet direction of the nozzles out of the collision zone and deflects it onto a structured impact wall, which avoids or prevents a rebounding of particles formed in the collision zone.

In particular in conjunction with the dimensioning of the fluid reactor used, the method preferably provides that the volume flow and optionally the density of the rinsing fluid flow is adapted to the volume flow and the densities of the first and second fluid media, so that a continuous equilibrium of the flow of the volume flows is established, which form such a geometry that prevents backflow of media or formed particles in the collision zone or in the free jets.

The fluid volume flow at the fluid nozzle is preferably from 100 to 1000 mL/min, especially from 125 to 500 mL/min, preferably from 200 to 300 mL/min, in a specific variant about 250 mL/min. The nozzle diameter is preferably about 300 μm.

The gas volume flow of the rinsing fluid is preferably from 1 to 20 L/min, especially from 1 to 10 L/min, preferably from 3 to 8 L/min, in a specific variant about 5 L/min.

It is preferably provided that the method uses a rinsing fluid which is an inert gas or an inert gas mixture. In an alternative embodiment, the rinsing fluid is a liquid. This liquid is preferably less dense than the first and second fluid media used for collision and precipitation of the particles, more preferably less dense than the first fluid medium containing the component to be precipitated.

The invention will be explained in more detail in the following examples, which are not to be understood as being restrictive:

FIG. 1 shows a schematic depiction of the functional principle on the basis of the schematic sectional view of a fluid reactor according to the invention. The reactor is depicted in two parts in the version shown, in which context one housing part 36 associated with the first nozzle 10 can be connected to create a seal by means of a flange 39 with a second housing part 38 associated with the second nozzle 20. In this case, the collision space 40 enclosed in the housing 30 has two oppositely directed and collinearly arranged fluid nozzles 10, 20 arranged so that they directly face one another in a common collision zone 50, so that free jets exiting from the nozzle head 11 on the one hand and the nozzle head 21 on the other hand collide there. According to the invention, a fluid conducting structure or flow guiding channel 44 is formed at least in the area of the first nozzle 10. This structure is structured in such a way that a rinsing fluid introduced into the rinsing fluid inlet 32 is deflected by the fluid conducting structures 44 such that a directed flow of the rinsing fluid forms along the flow direction of the fluid nozzles 10, 20, specifically at least in the area of the collision zone 50. The rinsing fluid can be removed from the collision chamber 40 through the outlet 34 together with a nanoparticulate fluid formed in the collision zone 50. In the illustrated embodiment, a structured impact wall 46 is additionally provided within the collision chamber, at least in the area associated with the second nozzle 20.

FIG. 2A shows the embodiment according to FIG. 1 in an open condition. FIG. 2C shows an external view of the reactor according to FIG. 1 in a closed condition. FIG. 2B shows a schematic representation of the operating state of the fluid reactor according to FIG. 1, in which context a directed gas flow 55 being created in the fluid reactor deflects a collision disk 52 forming in the collision zone 50 between the nozzles in the direction of flow of the first nozzle, with the result that the nanoparticulate fluid from the first reactor collision disk 52 meets the impact wall 46 and, in another respect, can ultimately be discharged from the fluid reactor via the outlet 34 together with the rinsing fluid. The collision zone 50 is located below the plane of the flange 39 between the two housing halves 32, 34. The collision disk 52 forms in the reactor below the flange 39. Deposits on the flange can be avoided in this manner, which also minimizes the risk of contaminating the nanoparticulate fluid on the flange seal.

Figure 3A:
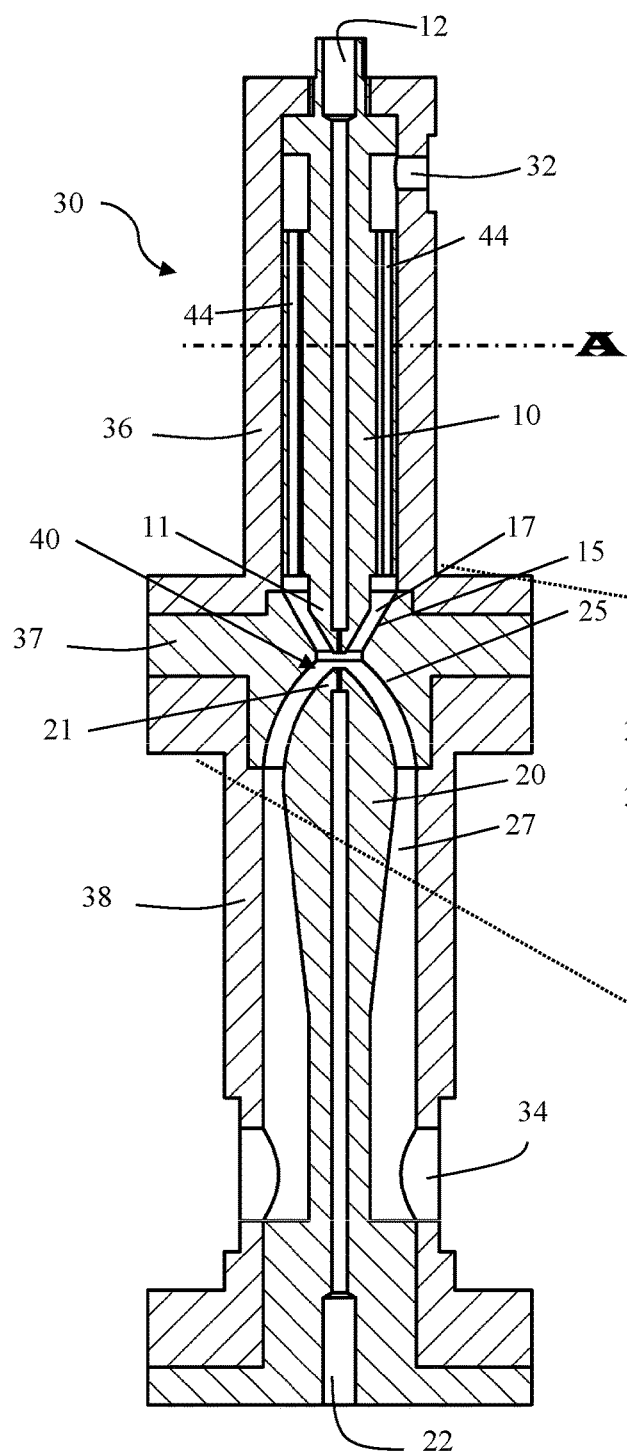
Figure 3B:
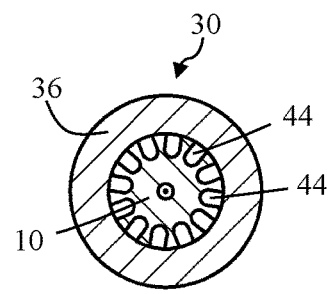

FIG. 3A shows a cross section through a preferred embodiment of a fluid reactor according to the invention. A three-piece design is chosen, in which the upper housing portion 36, associated with the first nozzle 10 is connected to the lower housing part 38, associated with the second nozzle 20 by means of a washer 37 in the area of the collision zone, creating a seal. In the illustrated embodiment, the nozzle bodies of the nozzles 10, 20 are separately inserted into the housing parts 36, 38.

The first nozzle 10 can be connected via an inlet 12 to a high-pressure pump. The nozzle 20 can be connected via an inlet 22 to a second high-pressure pump. In the housing part 36, at least one inlet 32 is designed for the rinsing medium. In the housing part 38, at least one outlet 34 is designed for the formed nanoparticulate fluid and the rinsing fluid. FIG. 3B shows a cross section through the housing part 36 of FIG. 3A in the area of section line A. The nozzle 10 is inserted within the wall of the housing 30, the shaft of the fluid conducting structures 44 that are parallel to the housing wall and concentrically arranged around the nozzle, said channels serving as flow-conducting structures and allowing a directed flow of rinsing fluid along the nozzle 10 toward its tip 11.

Figure 3C:
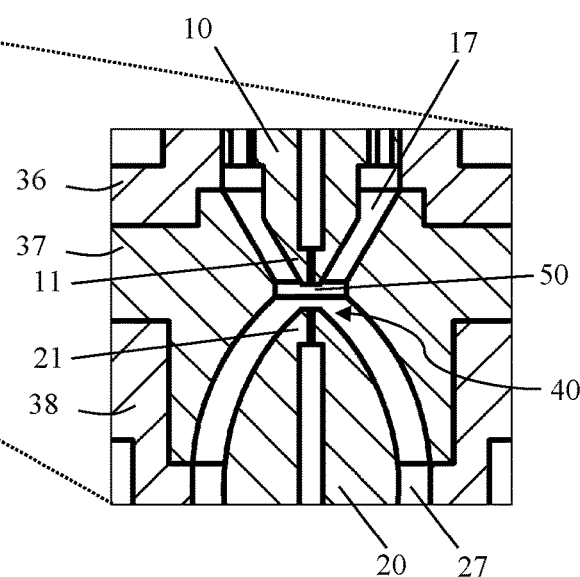

FIG. 3C shows a detail of the embodiment according to FIG. 3A in the area of the collision zone 50. At the tip 11 of the first nozzle, the fluid conducting structures 44 open into a fluid-conducting area 17, which is formed by the tip of the first nozzle and a projection 15 of the housing wall in the flow direction below the collision zone 50. The tip 21 of the second nozzle forms the second fluid conducting space 27 with the projection 25 of the housing, said conducting space receiving a formed nanoparticulate fluid formed on the collision disk at the collision zone 50 and leading it away together with a through-flowing rinsing fluid.

Figure 4A:
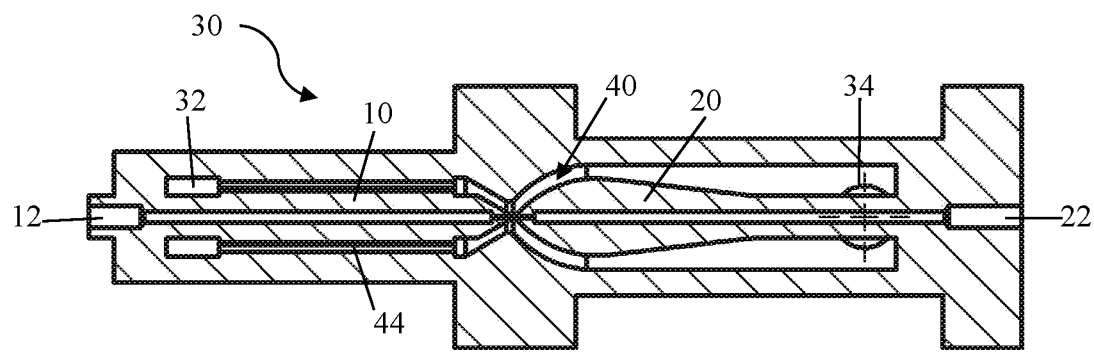
Figure 4B:
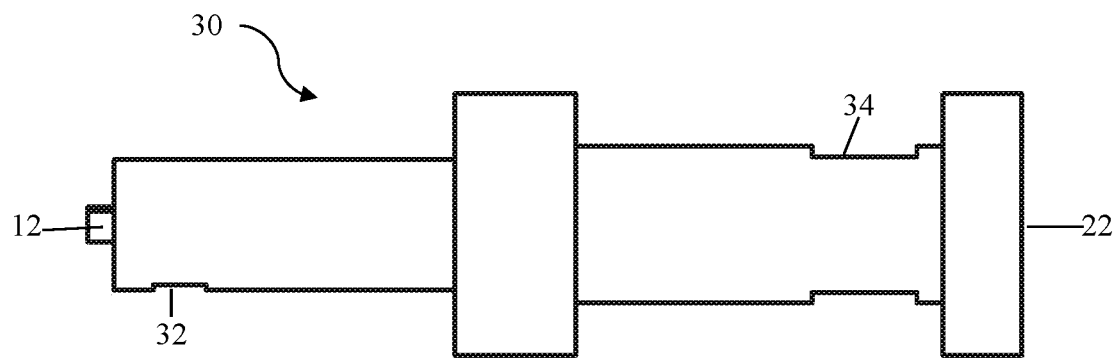
Figure 4C:
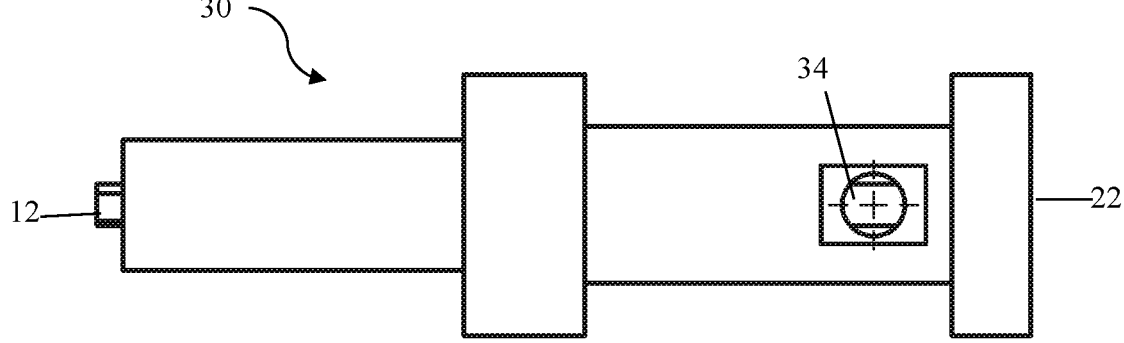
Figure 4D:
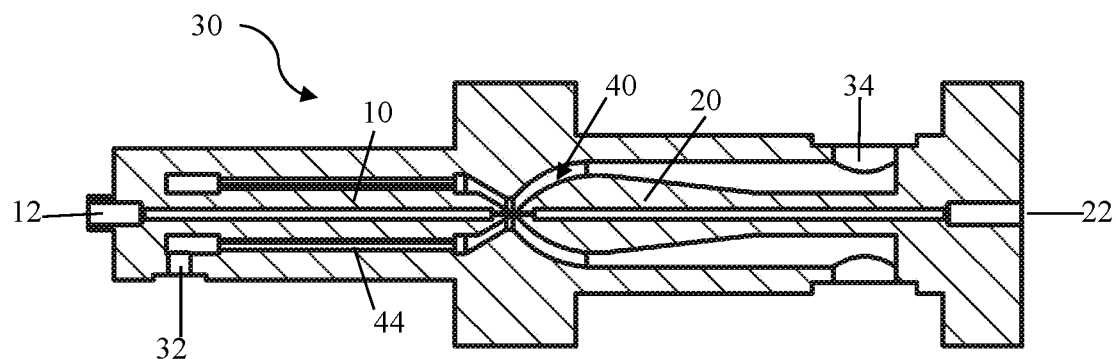

FIGS. 4A to 4D show schematic longitudinal sectional views and side views of a further preferred embodiment of the fluid reactor according to the invention. FIG. 4A shows a sectional view, and FIG. 4C shows the outside view of the corresponding orientation. FIG. 4D shows a sectional view of the embodiment according to FIG. 4A with the cross-sectional plane perpendicular thereto. FIG. 4B shows the associated external view of the correspondingly oriented embodiment.

The invention claimed is:

1. A fluid reactor for generating particulate fluids by collision, the fluid reactor comprising:
   having a housing which encloses a collision chamber;
   a first fluid nozzle;
   a second fluid nozzle oriented opposite to the first fluid nozzle in a collinear manner, and located directly opposite the first fluid nozzle in a jet direction of the fluid nozzle in a common collision zone;
   at least one rinsing fluid inlet into the collision chamber arranged on a first side of the first fluid nozzle; and
   at least one product outlet out of the collision chamber arranged on a second side of the second fluid nozzle,
   wherein rinsing-fluid-conducting structures are designed as parallel channels on a side of the first fluid nozzle, which are suitable in the collision chamber, in an area of the collision zone, to produce a rinsing fluid flow directed in the jet direction of the first fluid nozzle.

2. The fluid reactor according to claim 1, wherein, in the collision chamber on the second side of the second fluid nozzle, an open-pored or sponge-like structured impact wall is formed.

3. The fluid reactor according to claim 1, wherein a projection is formed, which creates, in an area of a head of the first fluid nozzle, a concentrically arranged tapered first fluid conducting space in the collision chamber around the first fluid nozzle.

4. The fluid reactor according to claim 1, wherein a projection is formed, which creates, in an area of a head of the second fluid nozzle, a concentrically arranged tapered second fluid conducting space in the collision chamber around the second fluid nozzle.

5. The fluid reactor according to claim 1, wherein a shaft of the second fluid nozzle tapers from a head of the second fluid nozzle towards a base of the second fluid nozzle, and a fluid expansion space is thus formed between the second fluid nozzle and a wall of the collision chamber.

6. A method for the preparation of nanoparticulate fluid from components dissolved in a solvent, the method comprising:
   pressing a first fluid medium having components dissolved therein through a first fluid nozzle; and
   pressing a second fluid medium containing precipitating agent through a collinear, oppositely oriented second fluid nozzle immediately opposite the first fluid nozzle in such a manner that first and second free jets emerging from the first and second fluid nozzles, respectively, collide with one another in a collision zone at such a high speed that the component dissolved in the first medium is precipitated by the precipitating agent, and a collision disk of the precipitated component extending from the collision zone transversely to a jet direction of the first and second fluid nozzles is formed as a nanoparticulate fluid,
   wherein a rinsing fluid flow that is directed parallel to the jet direction of the first and second fluid nozzles deflects the forming collision disk of nanoparticulate fluid in a direction of rinsing fluid flow, and the rinsing fluid flow conveys the formed nanoparticulate fluid in the jet direction of the first and second fluid nozzles out of the collision zone into a fluid expansion space,
   wherein the nanoparticulate fluid is recovered from the rinsing fluid flow.

7. The method according to claim 6, wherein the fluid expansion space avoids or prevents a rebounding of formed particles into the collision zone.

8. The method according to claim 6, wherein the rinsing fluid flow conveys the formed nanoparticulate fluid in the jet direction of the first and second fluid nozzles out of the collision zone and onto a structured impact wall, which avoids or prevents a rebounding of formed particles into the collision zone.

9. The method according to claim 6, wherein the volume flow and optionally also the density of the rinsing fluid flow is adapted to the volume flow and the density of the first and second fluid medium, so that a backflow of media or formed particles in the collision zone is prevented.

* * * * *